United States Patent [19]

Early

[11] Patent Number: 5,685,393
[45] Date of Patent: Nov. 11, 1997

[54] TREE CLIMBING APPARATUS

[76] Inventor: W. O. Early, 2569 Old Jackson, Locust Grove, Ga. 30248

[21] Appl. No.: 598,391

[22] Filed: Feb. 8, 1996

[51] Int. Cl.⁶ ................................. A47C 9/10
[52] U.S. Cl. .......................... 182/133; 182/187
[58] Field of Search .................. 182/133, 134, 182/9, 187, 188, 141, 135

[56] References Cited

U.S. PATENT DOCUMENTS

| | | | |
|---|---|---|---|
| 742,447 | 10/1903 | Kidder | 182/133 |
| 3,960,240 | 6/1976 | Cotton. | |
| 4,593,789 | 6/1986 | Treants | 182/134 X |
| 5,316,104 | 5/1994 | Amacker | 182/133 X |

FOREIGN PATENT DOCUMENTS 262459  2/1978  Germany ...................... 182/133

*Primary Examiner*—Alvin C. Chin-Shue
*Attorney, Agent, or Firm*—Rodgers & Rodgers

[57] ABSTRACT

A tree climbing apparatus includes a frame structure having a plurality of elongated frame elements interconnected at their ends and forming supports for rotatable tree gripping elements. A bracket is disposed about a tree to be climbed and is attached to a pair of lift rods. A pair of operating rods are connected with these lift rods to cause operating movement.

7 Claims, 3 Drawing Sheets

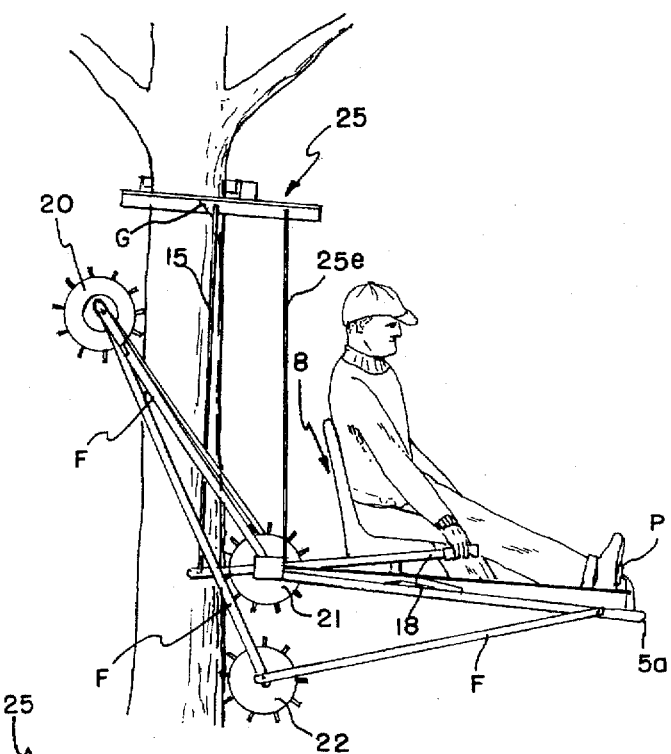
FIG. 3
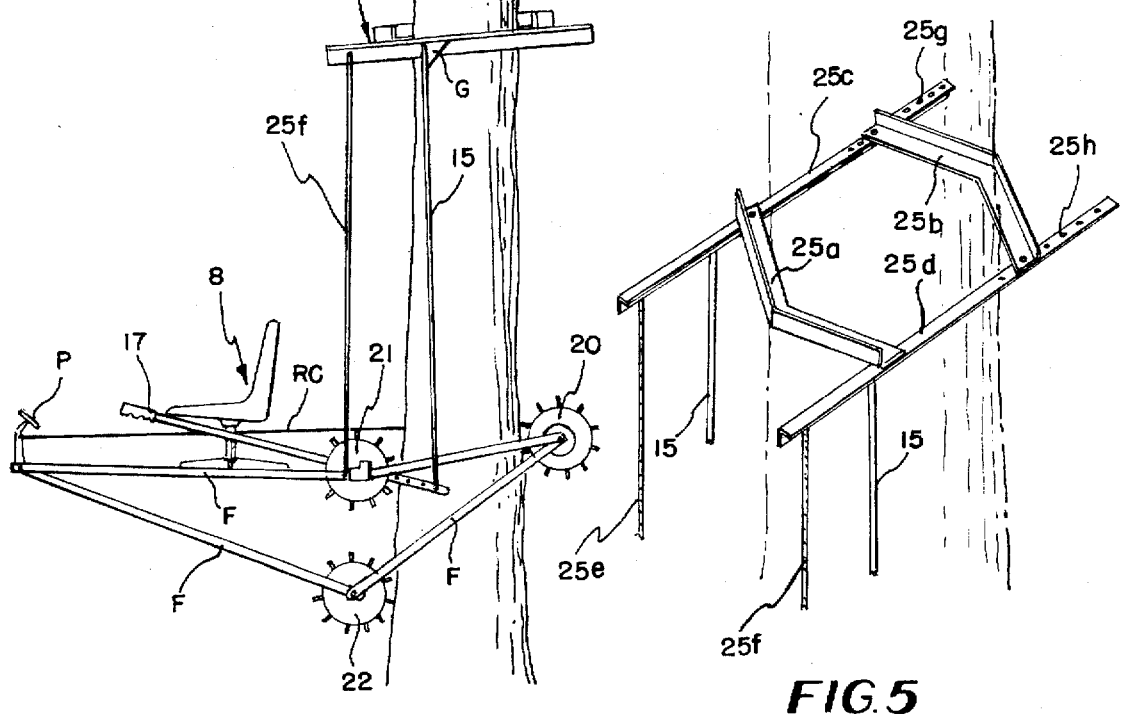
FIG. 4
FIG. 5

TREE CLIMBING APPARATUS

BACKGROUND OF THE INVENTION

This invention concerns tree climbing apparatus and the like. For example U.S. Pat. No. 3,960,240 issued Jun. 1, 1976 discloses and claims a tree climbing device which facilitates the up and down incremental movements of a climber. In general, known devices are awkward and bulky to manipulate and at times are prone to slippage and even operational failure.

SUMMARY OF THE INVENTION

According to this invention in one form, tree climbing apparatus embodies frame structure including elongated elements interconnected at their ends to form a support for the device. Rotatable tree gripping devices are arranged to engage the tree and are provided with a manually operable mechanism whereby the rotatable devices are operated to effect climbing of the tree. A bracket is disposed about a tree to be climbed and a pair of lift rods are connected with operating rods having extensions forming pivots and connecting links pivoted to lift rods which in turn are pivoted to the lift bracket. And a stop cable interconnected between the bracket and the apparatus frame to cause the lift bracket to become locked in position.

BRIEF DESCRIPTION OF THE DRAWINGS

In the drawings,

FIGS. 3, 4 and 5 show components of the invention in assembled condition with FIGS. 3 and 4 viewed from opposite sides of the tree being climbed;

FIG. 5 is an enlarged perspective view illustrating components of the lift bracket which characterize essential elements of this invention.

DESCRIPTION OF THE PREFERRED EMBODIMENT

Figure 1:
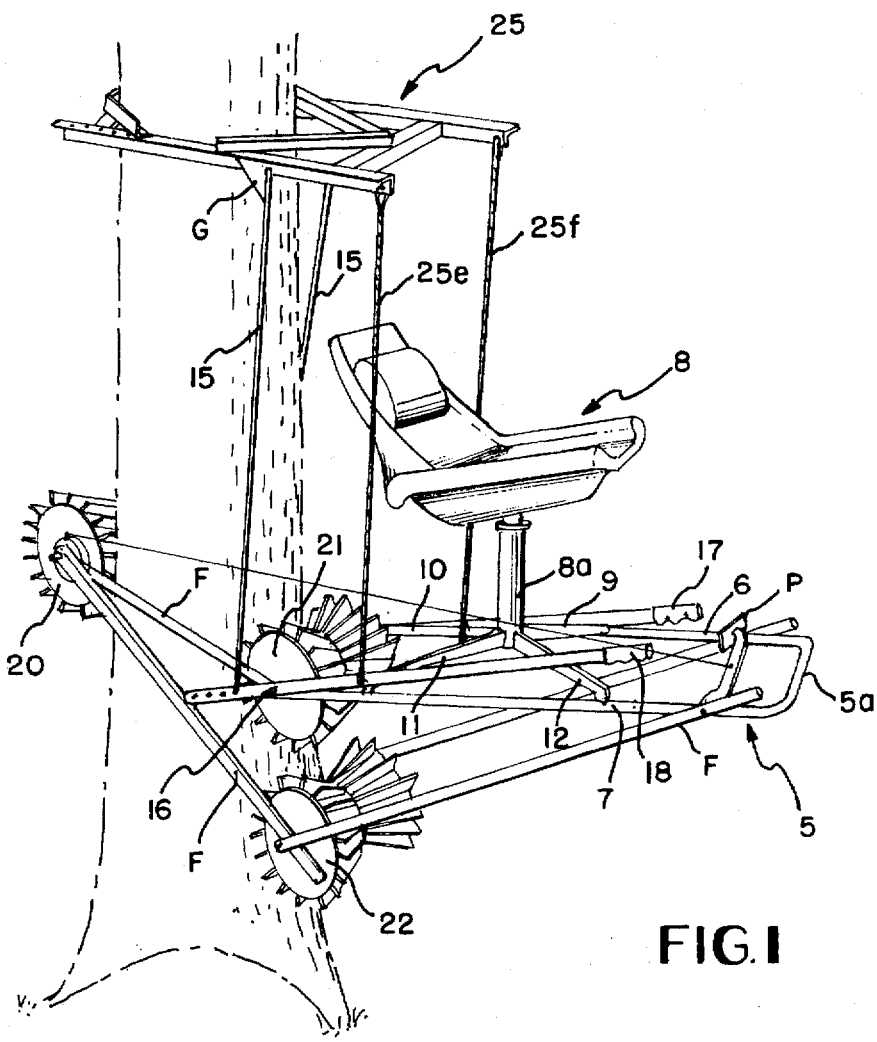
FIG. 1 is a perspective view of a tree climbing apparatus formed according to this invention and which is shown in a preliminary climbing stage of a schematically illustrated tree.
Figure 2:
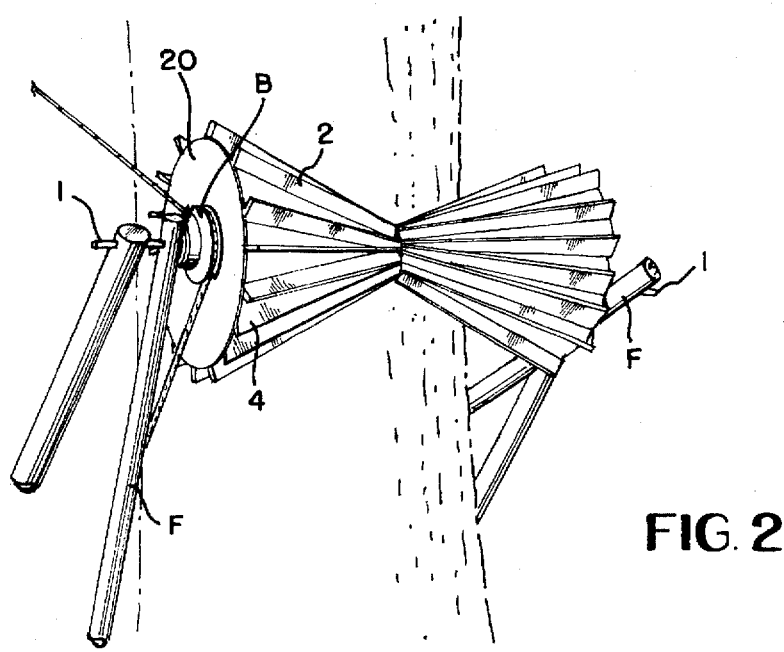
FIG. 2 is an enlarged perspective view of a rotatable tree climbing device such as is used in connection with this invention and is shown with the associated tree in phantom lines.
Figure 6:
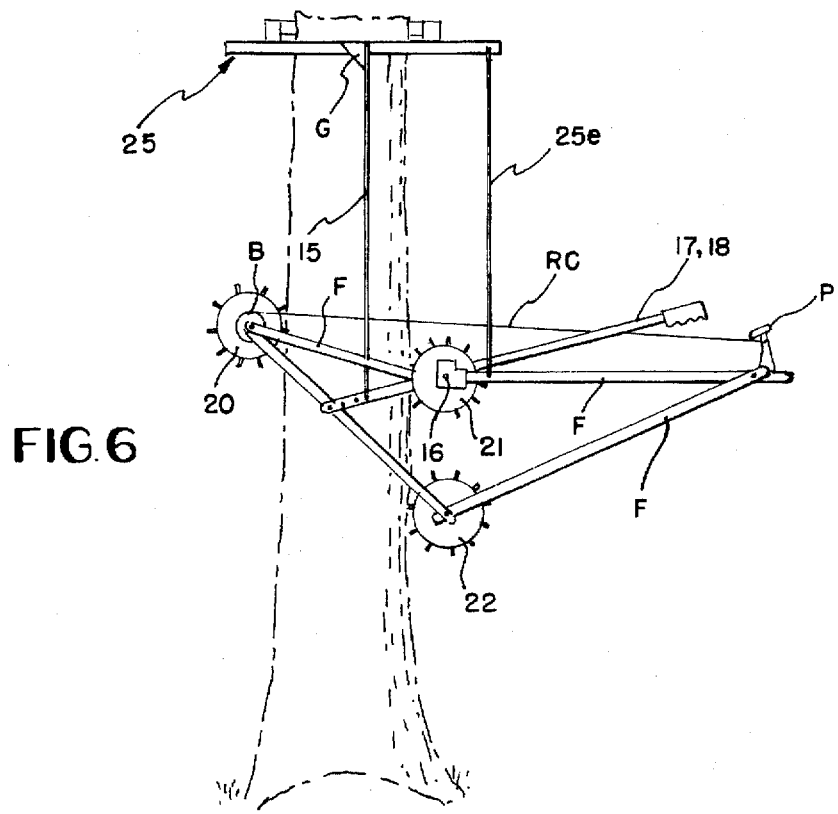
FIGS. 6, 7 and 8 are schematic detailed views of the invention.
Figure 7:
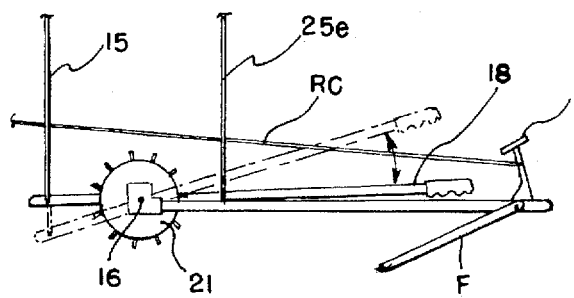
Figure 8:
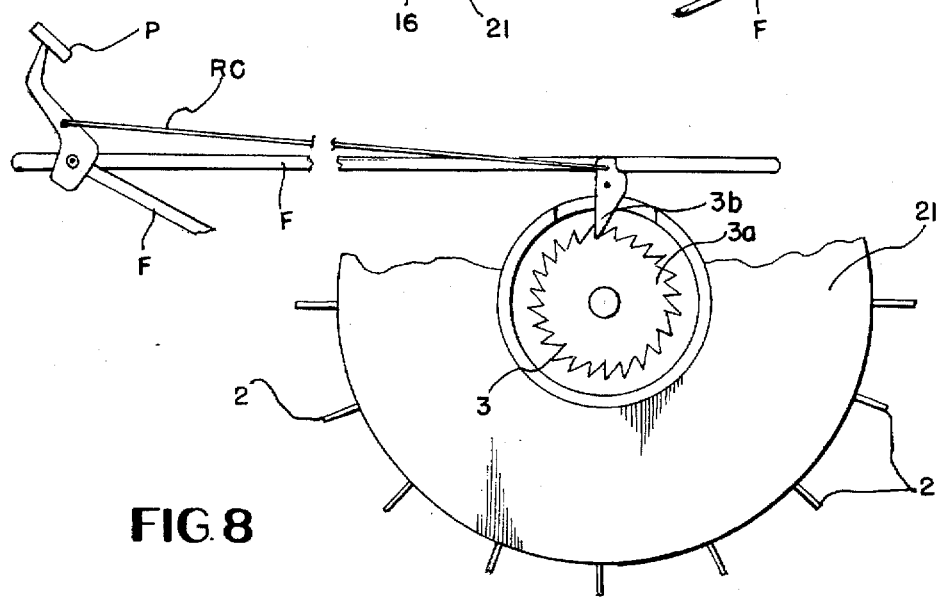

In FIG. 1, a plurality of elements are designated by the letter F and constitute the frame for the tree climbing apparatus. Also, in FIG. 1, components of the invention are shown in conjunction with a phantom tree in the process of a climbing operation. FIG. 2 discloses a rotatable tree engaging device according to this invention having an elongated central shaft designated by the numeral 1 which is supported by frame elements F together with tree engaging grippers designated by the numeral 2. Ratchet 3 is mounted on central shaft 1 and includes pawl 3a which cooperates with dog 3b in known fashion as shown in FIG. 8. As is clear from FIG. 2, tree engaging grippers 2 project in a radial direction from central shaft 1 and extend outwardly away from the midpoint of central shaft 1. Grippers 2 are of maximum spacing from central shaft 1, as indicated at 4.

As is best shown in FIG. 1, U-shaped device 5 includes a bight portion 5a together with a pair of rearwardly extending linear portions 6 and 7. Support chair 8 includes a plurality of radial support arms 9, 10, 11 and 12 and post 8a upstanding therefrom. Support arms 9 and 10 rest on linear portion 6 while support arms 11 and 12 rest on linear portion 7.

When operating rods 17 and 18 are pushed downwardly the rods 15 via pivot 16 impart upward movement to bracket 25. The seat 8 does not move but the cables 25e and 25f become tight. A gusset G is secured to the lift rods 15 and serves to hold the bracket assembly 25 in a horizontal plane. The weight of the operator causes the bracket 25 to pull down slightly at an angle in the front to aid in anchoring the apparatus in place. This insures secure functioning of the apparatus during lifting operations.

Bracket 25 simply aids in anchoring the tree climbing apparatus in place to insure secure functioning of the apparatus during the lifting or lowering operations and is arranged so that bracket 25 is disposed about the trunk of a tree to be climbed. Specifically, tree engaging arms 25a and 25b are secured to side bars 25c and 25d, as best shown in FIG. 5. Side bars 25c and 25d are attached to stop cables 25e and 25f, respectively and lift rods 15 are secured, respectively to side bars 25d and 25c.

In operation, the adjustment holes 25g and 25h in side bars 25c and 25d are to allow for different tree diameters. The user sits in chair 8 as shown in FIG. 3. Rotatable devices 20, 21 and 22 play no part in the lifting operation but simply rotate freely whenever the apparatus is ascending or descending. The descent is a free fall operation in which the speed of the descent is controlled by the pressure applied by pedal P. Ascent is accomplished when bracket 25 is caused to move upwardly by means of the upward force on lift rods 15 via pivot 16.

The descent speed is controlled by a friction type brake B mounted on the same shaft 1 as pawl 3a in FIG. 8. This brake may be of a design similar to that employed on bicycles or the like or may be composed of a steel cable tightly wound about a drum member. As pressure is applied to pedal P the cable RC is tightened about the drum.

I claim:

1. Tree climbing apparatus comprising a frame structure, said frame structure including a plurality of interconnected elongated rigid frame elements, three rotatable devices interconnected to said frame structure by means of said elongated rigid frame elements, two of said rotatable devices engageable with one side of a tree to be climbed, the other of said rotatable devices being engageable with the other side of said tree, a bracket disposed about said tree and spaced vertically above said frame structure, a pair of lift rods connected to said bracket, a pair of rotatable operating rods connected respectively to said lift rods and to said frame structure, and each of said rotatable devices comprising a central shaft and a plurality of radial grippers mounted on said shaft.

2. Tree climbing apparatus according to claim 1 wherein a chair is mounted on said frame structure.

3. Tree climbing apparatus according to claim 1 wherein a ratchet is mounted on one of said two rotatable devices.

4. Tree climbing apparatus according to claim 3 wherein said ratchet comprises a pawl and a dog assembly.

5. Tree climbing apparatus according to claim 4 wherein a brake pedal is rotatably mounted on said frame structure, said dog is rotatable, and said brake pedal is rotatably connected to said dog at a point spaced from the axis of rotation of said dog.

6. Tree climbing apparatus according to claim 1 wherein a pair of stop cables are connected to said bracket and respectively to said operating rods.

7. Tree climbing apparatus according to claim 1 wherein said central shaft has oppositely disposed ends and the length of said grippers varies from a minimum radial length midway between said ends to increased lengths near said ends.

* * * * *